(12) United States Patent
Livingston et al.

(10) Patent No.: US 9,582,167 B2
(45) Date of Patent: Feb. 28, 2017

(54) REAL-TIME MANAGEMENT OF PRESENTATION DELIVERY

(71) Applicant: International Business Machines Corporation, Armonk, NY (US)

(72) Inventors: Suzanne O. Livingston, Charlestown, MA (US); Ethan L. Perry, Lexington, MA (US); Scott H. Prager, Stratham, NH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 470 days.

(21) Appl. No.: 13/966,386

(22) Filed: Aug. 14, 2013

(65) Prior Publication Data

US 2015/0052440 A1 Feb. 19, 2015

(51) Int. Cl.

| | |
|---|---|
| G06F 3/048 | (2013.01) |
| G06F 3/0484 | (2013.01) |
| G06F 17/30 | (2006.01) |
| G11B 27/031 | (2006.01) |
| G11B 27/28 | (2006.01) |
| G06Q 10/10 | (2012.01) |
| H04N 1/00 | (2006.01) |
| G06Q 10/06 | (2012.01) |
| G06F 17/21 | (2006.01) |

(52) U.S. Cl.
CPC .... *G06F 3/04845* (2013.01); *G06F 17/30056* (2013.01); *G11B 27/031* (2013.01); *G11B 27/28* (2013.01); *G06F 17/211* (2013.01); *G06Q 10/06* (2013.01); *G06Q 10/109* (2013.01); *H04N 1/00198* (2013.01); *H04N 1/00458* (2013.01)

(58) Field of Classification Search
CPC ............. G06F 17/30056; G06F 17/211; G06Q 10/109; G06Q 10/06; H04N 1/00198; H04N 1/00458
See application file for complete search history.

(56) References Cited

U.S. PATENT DOCUMENTS

| | | | |
|---|---|---|---|
| 8,245,134 B2 | 8/2012 | Bodin et al. | |
| 2003/0222890 A1 | 12/2003 | Salesin et al. | |
| 2005/0240407 A1* | 10/2005 | Simske | G10L 17/00 704/246 |
| 2006/0020895 A1* | 1/2006 | Keohane | G09B 5/02 715/732 |
| 2007/0271580 A1* | 11/2007 | Tischer et al. | 725/35 |
| 2007/0282948 A1* | 12/2007 | Praino et al. | 709/204 |

(Continued)

*Primary Examiner* — Patrick Riegler
(74) *Attorney, Agent, or Firm* — Cuenot, Forsythe & Kim, LLC

(57) ABSTRACT

Managing the delivery of a presentation in real-time includes receiving a presentation including a plurality of slides, wherein each slide of the plurality of slides is allocated an amount of time for display during delivery of the presentation and is associated with a slide subject, determining subjects of interest for an audience of the presentation from a social media website, and correlating, using a processor, the subjects of interest with the plurality of slides of the presentation. A recommendation is generated using the processor. The recommendation specifies a modification to the presentation according to the correlation of subjects of interest with the plurality of slides of the presentation. Further, the recommendation is indicated using a display.

20 Claims, 3 Drawing Sheets

(56) References Cited

U.S. PATENT DOCUMENTS

2009/0138332 A1\* 5/2009 Kanevsky et al. ............. 705/10
2009/0210796 A1\* 8/2009 Bhogal et al. ................ 715/730
2010/0318399 A1\* 12/2010 Li et al. ............................ 705/9
2011/0154266 A1\* 6/2011 Friend et al. ................. 715/863
2011/0196862 A1 8/2011 Bergman et al.
2012/0159332 A1 6/2012 Piccinini et al.
2012/0323579 A1\* 12/2012 Gibbon et al. ................ 704/270
2014/0237371 A1\* 8/2014 Klemm et al. ................ 715/730
2014/0344702 A1\* 11/2014 Edge et al. ................... 715/730

\* cited by examiner

REAL-TIME MANAGEMENT OF PRESENTATION DELIVERY

BACKGROUND

A presentation refers to a file specifying a collection of digitized slides that are to be displayed or otherwise presented to an audience in a particular order or sequence. Each slide includes content in the form of text, images, audio material, audiovisual material, and/or the like. The presentation may be delivered by way of an on-line meeting such as a Webinar or in-person to an audience within the same physical space or room as the presenter.

When delivering a presentation, a presenter must manage a variety of different tasks concurrently. For example, the presenter must stay on schedule by ensuring that the planned amount of time is actually used for each topic of the presentation. The presenter further must balance the presentation schedule with the perceived level of audience interest or enthusiasm as determined by the presenter based upon audience reactions and feedback. These tasks can be difficult to manage.

BRIEF SUMMARY

One or more embodiments disclosed within this specification relate managing the delivery of a presentation in real-time.

One embodiment includes a method. The method includes receiving a presentation having a plurality of slides, wherein each slide of the plurality of slides is allocated an amount of time for display during delivery of the presentation and is associated with a slide subject, determining subjects of interest for an audience of the presentation from a social media website, and correlating, using a processor, the subjects of interest with the plurality of slides of the presentation. The method further includes generating, using the processor, a recommendation that specifies a modification to the presentation according to the correlation of subjects of interest with the plurality of slides of the presentation and indicating the recommendation using a display.

Another embodiment includes a system. The system includes a processor programmed to initiate executable operations. The executable operations include receiving a presentation having a plurality of slides, wherein each slide of the plurality of slides is allocated an amount of time for display during delivery of the presentation and is associated with a slide subject, determining subjects of interest for an audience of the presentation from a social media website, and correlating the subjects of interest with the plurality of slides of the presentation. The executable operations further include generating a recommendation that specifies a modification to the presentation according to the correlation of subjects of interest with the plurality of slides of the presentation and indicating the recommendation using a display.

Another embodiment includes a computer program product. The computer program product includes a computer-readable storage medium having program code stored thereon. The program code is executable by a processor to perform a method. The method includes receiving, using the processor, a presentation having a plurality of slides, wherein each slide of the plurality of slides is allocated an amount of time for display during delivery of the presentation and is associated with a slide subject, determining, using the processor, subjects of interest for an audience of the presentation from a social media website, and correlating, using the processor, the subjects of interest with the plurality of slides of the presentation. The method further includes generating, using the processor, a recommendation that specifies a modification to the presentation according to the correlation of subjects of interest with the plurality of slides of the presentation and indicating, using the processor, the recommendation using a display.

DETAILED DESCRIPTION

Figure 1:
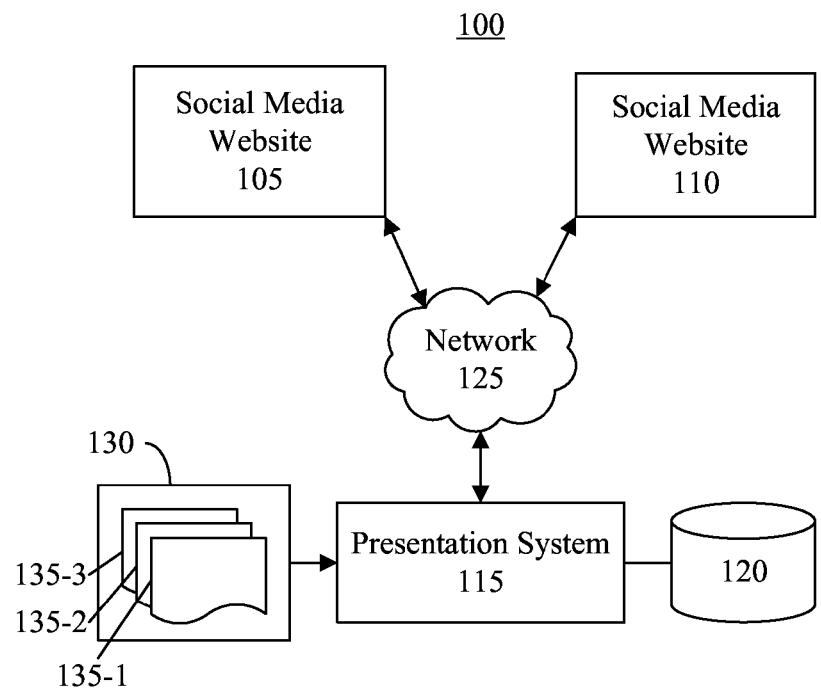
FIG. 1 is a block diagram illustrating an exemplary network computing system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. As defined herein, the term "computer-readable storage medium" means a tangible storage medium that contains or stores program code for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

One or more embodiments disclosed within this specification relate to managing the delivery of a presentation in real-time. In accordance with the inventive arrangements disclosed herein, a presentation can be modified in real-time while a presenter is delivering the presentation to an audience. As used herein, the phrase "real-time" means a level of processing responsiveness that a user or system senses as sufficiently immediate for a particular process or determination to be made, or that enables the processor to keep up with some external process. The term "delivering," in reference to a presentation, means the act of displaying one or more slides of the presentation to an audience of one or more members. Typically, delivering a presentation involves a presenter discussing content of the slides as the slides are displayed to the audience.

Modification of the presentation can be performed automatically by a data processing system. Modification of the presentation is based, at least in part, upon a correlation of subjects of interest to members of the audience with the subjects of slides of the presentation referred to herein as "slide subjects." In one aspect, subjects of interest to members of the audience are determined from social media websites. The presentation further can be modified automatically by the data processing system during delivery of the presentation responsive to other information such as whether the presentation is being delivered on schedule. These and other aspects of the embodiments disclosed herein are discussed in greater detail with reference to the drawings below.

FIG. 1 is a block diagram illustrating an exemplary network computing system 100. Network computing system 100 includes one or more data sources depicted as social media websites 105 and 110 and a presentation system 115. Each of social media websites 105 and 110 is implemented as a data processing system or a plurality of inter-connected data processing systems, e.g., servers providing or hosting websites. Presentation system 115 also is implemented as a data processing system. For purposes of illustration, a data storage device 120 is illustrated as being coupled to presentation system 115. It should be appreciated that data storage device 120 can be implemented within presentation system 115 as opposed to being a separate physical device as illustrated in FIG. 1.

"Social media" refers to a means of interaction among people where the people create, share, and exchange information and ideas in virtual communities and network. A "social media website" is a particular means, i.e., a website, for sharing information. Examples of social media websites include micro-blogging websites, blogging websites, social networking websites, bookmarking websites, and the like. The phrase "social media website," as used herein, further includes intranet sites within an organization that are not publicly accessible to users outside of the organization.

Presentation system 115 communicates with social media websites 105 and 110 via network 125. Network 125 is the medium used to provide communication links between various devices and data processing systems connected together within network computing system 100. Network 125 may include connections, such as wire, wireless communication links, or fiber optic cables. Network 125 can be implemented as, or include, any of a variety of different communication technologies such as a WAN, a LAN, a wireless network, a mobile network, a Virtual Private Network (VPN), the Internet, the Public Switched Telephone Network (PSTN), or the like.

In operation, presentation system 115 receives a presentation 130. Presentation 130 is a file that specifies or includes a plurality of slides 135. In the example pictured in FIG. 1, presentation 130 includes slides 135-1, 135-2, and 135-3, collectively referred to as slides 135 or presentation 130. A presentation, e.g., presentation 130, defines or specifies each of the plurality of slides included therein. Further, the slides that form the presentation have a defined or specified order. The order of the slides dictates the order in which slides are displayed to an audience during delivery of the presentation. Thus, referring to FIG. 1, the initial order of slides 135 of presentation 130 is slide 135-1, followed by slide 135-2, followed by slide 135-3.

A user, referred to as a "presenter," operates presentation system 115 to deliver presentation 130 to an audience. For example, presentation system 115 can include, or be coupled to, one or more display systems or devices, whether one or more monitors, one or more projection systems, or the like so that members of an audience can view slides 135 of presentation 130. Slides 135 are presented in the order specified within presentation 130. Further, slides 135 are associated with a schedule that specifies an amount of time that each slide or segment of presentation 130 is to be displayed.

In one aspect, the presenter is able to see a different view generated by presentation system 115 than members of the audience. For example, presentation system 115 outputs a user interface (UI) on a first display or display system that is viewable by the presenter and outputs different ones of slides 135 to a second and different display or display system in accordance with the order of slides 135 so that the displayed slides are viewable to members of the audience.

While the presenter delivers presentation 130 to members of the audience, presentation system 115 can perform a variety of presentation management tasks. In one example, as the presenter delivers presentation 130 to the audience, presentation system 115 accesses social media websites 105 and 110. For example, presentation system 115 can store or access a list of members of the audience. Using the list, presentation system 115 can access content for one or more or all members of the audience from social media website 105 and/or social media website 110. Using the content obtained from social media website 105 and/or social media website 110, presentation system 115 determines one or more subjects of interest to the members of the audience.

For example, presentation system 115 can download or obtain postings of members of the audience, shared or public profile data for members of the audience, content and/or subject matter about which one or more members of the audience have expressed sentiment, e.g., liked and/or disliked, tags, and/or other account data for the members of the audience from social media website 105 and/or social media website 110. In another example, presentation system 115 can download or obtain information indicating membership (s) of members of the audience in specific communities or groups. The content from the various sources noted can be evaluated by presentation system 115 to determine subjects of interest for the members of the audience.

Content from social media websites 105 and 110 can be obtained by presentation system 115 in an ongoing manner while the presenter is delivering presentation 130 to the audience. Accordingly, the particular subjects of interest, as determined using social media websites 105 and 110, may change over time and in real-time as the presenter continues to deliver presentation 130. In one aspect, presentation system 115 determines and maintains a current list of subjects of interest for members of the audience in data storage device 120.

As the presenter continues delivery of presentation 130 to an audience, presentation system 115 continues to determine subjects of interest for members of the audience from social media websites 105 and 110. Presentation system 115 correlates the subjects of interest of the members of the audience with portions of presentation 130. More particularly, subjects of interest to members of the audience determined from social media website 105 and/or social media website 110 are matched to slide subjects. For each subject of interest determined from a social media website that matches a slide subject for presentation 130, the subject of interest is stored in association with the number of members of the audience that have expressed an interest in that subject.

In another aspect, presentation system 115 can determine whether delivery of presentation 130 is progressing in accordance with a schedule that is stored for presentation 130. The schedule can specify an amount of time that is allocated, or to be spent, on each of slides 135 during delivery by the presenter. By storing or otherwise noting the start time of the delivery of presentation 130, the current location or slide within presentation 130, and the current time, presentation system 115 is able to determine whether delivery of presentation 130 is progressing on time in accordance with the schedule.

The schedule can be specified by the presenter prior to delivery of presentation 130. For example, the schedule can be stored as part of presentation 130 or be stored separately, but in association with presentation 130. In another aspect, the schedule can be generated from averaging or applying other statistical and/or processing techniques to historical timing data stored for presentation 130.

Historical timing data can include or specify which slides have been displayed and the amount of time actually spent on each slide. Historical timing data can be generated and stored from the presenter rehearsing delivery of presentation 130 on one or more different occasions and/or from actual delivery of presentation 130 by the presenter to an audience on one or more different occasions. From the stored historical timing data, presentation system 115 can generate the schedule. For example, presentation system 115 can calculate the average amount of time for each slide and use the average as the suggested or allocated amount of time for each slide. In any case, the schedule specifies the amount of time to be spent on each slide or an amount of time to be spent on a segment of the presentation including two or more slides.

Presentation system 115 can modify presentation 130 in real-time while the presenter is delivering presentation 130 to an audience. Modification of presentation 130 is performed based, at least in part, upon the correlation of subjects of interest to members of the audience with portions of presentation 130. Further, timing data indicating whether delivery of presentation 130 is on schedule can be evaluated. As such, presentation system 115 can modify presentation 130, at least in part, according to whether delivery of presentation 130 is on schedule.

Thus, as the presenter is delivering presentation 130 to an audience, presentation system 115 can modify any of a variety of aspects of presentation 130 according to subject matter and timing information. For example, presentation system 115 can change the order of slides 135, change which of slides 135 are included and presented to the audience, change the amount of time scheduled for a slide to be displayed to the audience, or the like. The modifications to presentation 130 made by presentation system 115 are determined automatically without involvement of the presenter. In one aspect, however, suggested modifications are only implemented responsive to approval from the presenter.

FIG. 1 is presented as an illustrative example. As such, the number of social media websites pictured is for purposes of illustration and not intended as a limitation of the embodiments disclosed herein. Network computing system 100 can include fewer or more social media websites or audience member information sources depending upon the configuration of presentation system 115. Further, display devices that are coupled to presentation system 115 are not shown.

Figure 2:
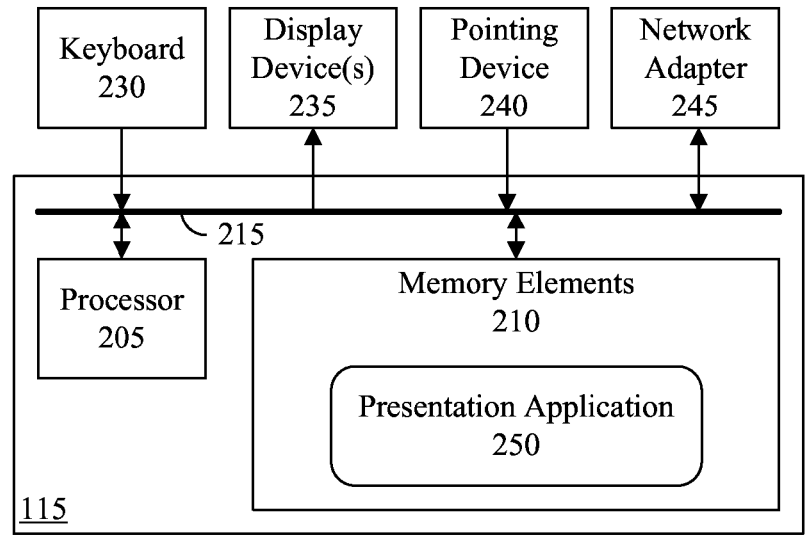
FIG. 2 is a block diagram illustrating an exemplary presentation system.

FIG. 2 is a block diagram illustrating an exemplary implementation of presentation system 115 of FIG. 1. As pictured, presentation system 115 can include at least one processor 205, e.g., a central processing unit, coupled to memory elements 210 through a system bus 215 or other suitable circuitry. Presentation system 115 can store program code within memory elements 210. Processor 205 executes the program code accessed from memory elements 210 via system bus 215 or the other suitable circuitry.

In one aspect, presentation system 115 is implemented as a computer or other programmable data processing apparatus that is suitable for storing and/or executing program code. It should be appreciated, however, that presentation system 115 can be implemented in the form of any system including a processor and memory that is capable of performing and/or initiating the functions and/or operations described within this specification.

Memory elements 210 include one or more physical memory devices such as, for example, local memory and one or more bulk storage devices. Local memory refers to RAM or other non-persistent memory device(s) generally used during actual execution of the program code. A bulk storage device can be implemented as a hard disk drive (HDD), solid state drive (SSD), or other persistent data storage device. Presentation system 115 also can include one or more cache memories (not shown) that provide temporary storage of at least some program code in order to reduce the number of times program code must be retrieved from a bulk storage device during execution.

Input/output (I/O) devices such as a keyboard 230, one or more display devices (or display systems) 235, and a pointing device 240 optionally can be coupled to presentation system 115. The I/O devices can be coupled to presentation system 115 either directly or through intervening I/O controllers. One or more network adapters 245 also can be coupled to presentation system 115 to enable presentation system 115 to become coupled to other systems, computer systems, e.g., social media websites, remote printers, remote displays, and/or remote storage devices through intervening private or public networks. Modems, cable modems, wireless transceivers, and Ethernet cards are examples of different types of network adapters 245 that can be used with presentation system 115.

Presentation system 115 can be implemented in any of a variety of different form factors. For example, presentation system 115 can be implemented as a server, a personal computer, a portable computer, e.g., a laptop, a tablet, a mobile communication device, or the like. Further, presentation system 115 can include I/O devices such as keyboard 230, display device 235, and pointing device 240 in any of a variety of different configurations, e.g., as an integrated display device in the form of a flat panel display or touch-screen that replaces keyboard 230 and/or pointing device 240, etc.

As pictured in FIG. 2, memory elements 210 can store presentation application 250. Presentation application 250 executes in conjunction with an operating system (not shown). Presentation application 250, when executed, causes presentation system 115 to perform the various operations described within this specification. It should be appreciated that presentation application 250, including any parameters and/or attributes utilized by presentation application 250, e.g., information stored within data storage device 120 of FIG. 1 or within memory elements 210 of FIG. 2, are functional data structures that impart functionality when employed as part of presentation system 115.

Figure 3:
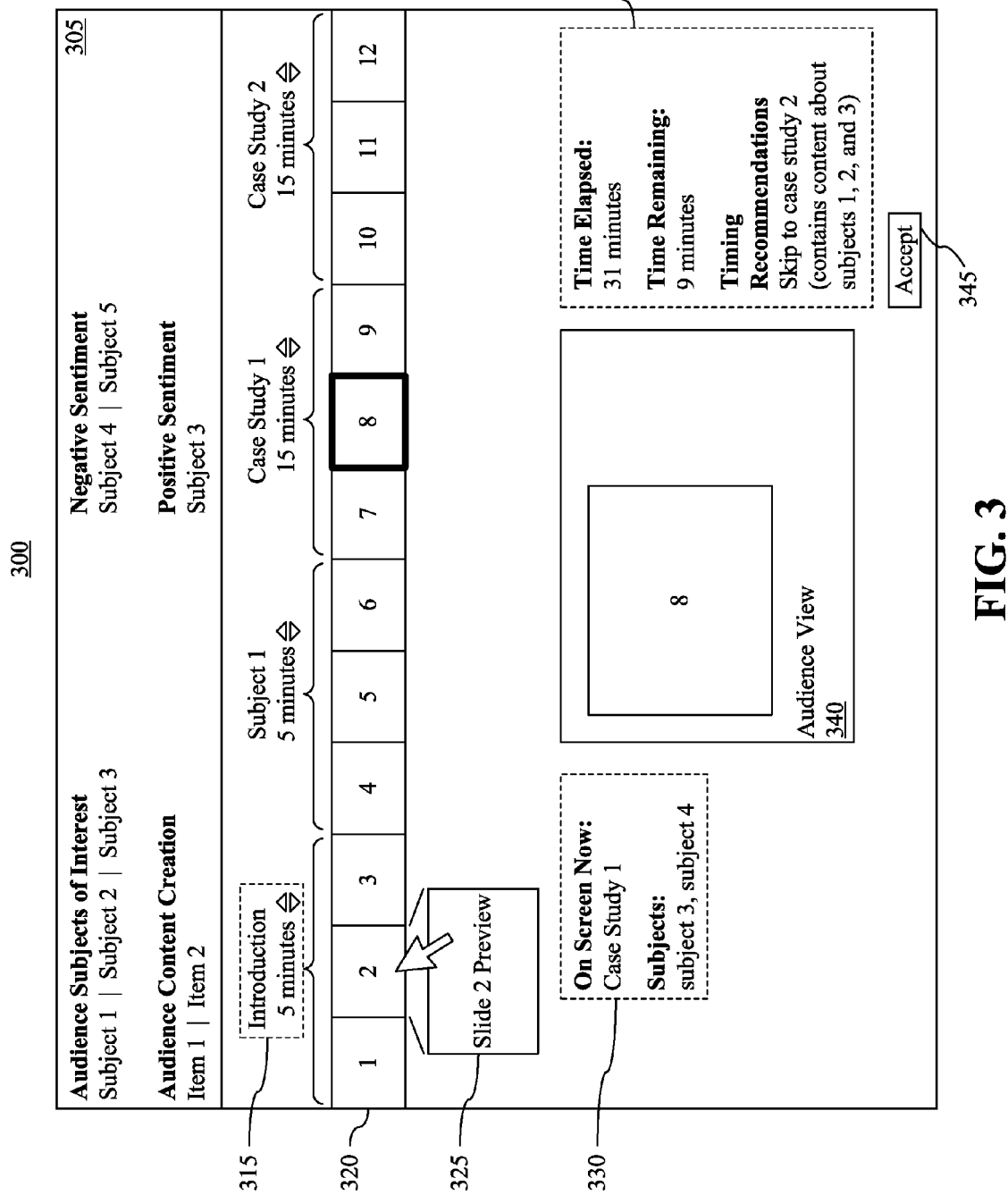
FIG. 3 is a block diagram illustrating an exemplary user interface for a presentation system.

FIG. 3 is a block diagram illustrating an exemplary UI 300 for a presentation system. UI 300 is an illustrative example of the interface that can be generated and displayed by presentation system 115 to a presenter while delivering a presentation to an audience. UI 300 includes a plurality of different sections that provide a presenter with updated, real-time information relating to subjects of interest for members of the audience and timing information for the presentation as delivered.

As discussed, the presentation system can store a list of audience members. Each member on the list can be associated with one or more social media websites from which audience member-specific social media data be obtained. The presentation system can access or query the social media websites associated with the members of the audience, retrieve social media data for the members of the audience from the social media websites, and display such the data items within section 305 in an aggregated form.

Section 305 displays subjects of interest for members of the audience that have been correlated with, or matched to, slide subjects of the presentation being delivered. The subjects of interest are aggregated across the audience as a whole. Thus, subject 1, subject 2, and subject 3 under "Audience Subjects of Interest" are those subjects found to be of interest to members of the audience that are also matched to slide subjects of the presentation. In one aspect, subject 1, subject 2, and subject 3 also have at least a minimum number of members of the audience expressing interest.

In another aspect, the "N" subjects of interest with the largest number of members expressing interest that match slide subjects can be displayed in decreasing order, where N is an integer such as 3 in this case. Thus, in the example of FIG. 3, subject 1, as determined from social media websites, matches a slide subject of the presentation and has the largest number of members of the audience expressing interest. Subject 2, as determined from social media websites, matches a slide subject of the presentation and has the second largest number of members expressing interest. Subject 3, as determined from social media websites, matches a slide subject of the presentation and has the third largest number of members of the audience expressing interest.

Subjects of interest can be determined directly from posted interests on the social media websites for members of the audience, from tags, or the like. Subjects of interest also can be determined from positive or negative sentiment expressed on one or more social media websites for particular subjects. Those subjects for which audience members have expressed negative sentiment on a social media website, e.g., a "thumbs down" or a "dislike," and that match a slide subject can be displayed under "Negative Sentiment." Those subjects for which audience members have expressed positive sentiment on a social media website, e.g., "thumbs up" or "like," and that match a slide subject can be displayed under positive sentiment.

In addition, subjects of interest for audience members can be determined from particular items of content created and posted on social media websites by members of the audience. Exemplary items of content creation include, but are not limited to, blogs, podcasts, audio material, visual material, audiovisual material, program code, or other digital material and/or files made available on a website. While each item of content creation may be classified into a subject, the existence of the item of content creation itself can be considered a subject of interest. For example, the presentation system can determine that a member of the audience that podcasts about computer technology has an interest in computer technology as the subject in which the podcast is classified or possibly tagged and in podcasting which is determined from the item of content creation itself.

UI 300 further displays presentation segments, e.g., segment 315, above a slide order view 320. Slide order view 320 can display a visual representation of each of the plurality of slides of the presentation, or at least a subset of slides of the presentation, in the sequence or order in which the slides are to be presented or displayed to the audience. In this example, the slides are numbered from 1 to 12. It should be appreciated, however, that the slide representations within the slide order view 320 can be thumbnails or other visual representations of the slides.

Segments of the presentation are illustrated above slide order view 320. As shown, each of a plurality of different segments of the presentation is visually indicated as the "Introduction" including slides 1, 2, and 3; "Subject 1" including slides 4, 5, and 6; "Case Study 1" including slides 7, 8, and 9; and "Case Study 2" including slides 10, 11, and 12. As part of the segment, UI 300 displays the amount of time that has been allocated to each respective segment. In addition, a control is provided that allows the presenter to manually change the amount of time allocated to any of the segments shown in slide order view 320.

Responsive to the presenter selecting a slide representation within slide view 320, a preview of the slide is displayed. In the example shown, the presenter has selected slide 2 using a pointing device. Responsive to selection of slide 2, a preview 325 of slide 2 is displayed in UI 300. A preview is a visual representation of the actual content and appearance of the slide.

UI 300 further includes an audience view 340. Audience view 340 displays a representation, or smaller view, of what the audience is currently viewing while the presentation is being delivered. In this example, the audience is currently viewing slide 8. The slide currently shown to the audience also can be highlighted within slide order view 320 as shown with bold outlining for the representation of slide 8.

Section 330 includes data such as the particular segment of the presentation to which the slide currently being shown to the audience belongs. Further, within section 330, the particular subjects that are addressed in the slide being shown to the audience, i.e., slide 8, are listed. In this example, slide 8 includes information relating to subjects 3 and 4. In another example, however, the subjects, i.e., subjects 3 and 4, are the subjects that are addressed or discussed within the segment of the presentation being shown as opposed to the particular slide that is shown. In that case, the segment Case Study 1, as opposed to slide 8 in particular, relates to subjects 3 and 4.

Section 335 displays timing data for the delivery of the presentation. As shown, section 335 displays the elapsed time as measured from the starting time or beginning of delivery of the presentation. Section 335 further displays the remaining time, which is the amount of time left out of the total time allocated for delivery of the presentation. In this example, the total time allocated for delivery of the presentation is 40 minutes. Since 31 minutes have elapsed, only 9 minutes remain to deliver the remaining segment(s) of the presentation.

Section 335 further provides a recommendation that is generated by the presentation system. The recommendation can be generated in real-time as the presenter delivers the presentation. In this regard, the recommendation can change as the presenter continues to deliver the presentation based upon any of a variety of factors.

In one aspect, the recommendation is generated based upon the correlation of subjects of interest of the audience with slide subjects of the presentation to determine which portion of the presentation may need modification. For example, the presentation system may generate a recommendation that suggests allocating more time to a subject, and correspondingly, a slide, slides, segment, or segments of the presentation, of greater interest to members of the audience. The presentation system may generate a recommendation that suggests allocating less time to a subject of the presentation of lesser interest to members of the audience.

A subject considered to be of lesser interest to the audience is a subject in which fewer than a threshold number of members of the audience have been determined to have an interest. In another aspect, a subject of lesser interest to the audience is a subject in which a smallest number of members of the audience or no members of the audience have an interest. In still another aspect, subjects of lesser interest to the audience are the "N" subjects having the "N" smallest numbers of members of the audience having an interest, wherein N is an integer value of one or more. A subject considered to be of greater interest to the audience is a subject in which the number of members of the audience determined to have an interest is the same as or greater than a threshold number of members. The threshold used for determining subjects of greater interest may be the same as or different from the threshold used for determining subjects of lesser interest. In another aspect, a subject of greater interest is one that has the largest number of members of the audience having an interest. In still another aspect, subjects of greater interest are those that have the N largest numbers of members of the audience having in interest.

In illustration, if slides 4, 5, and 6 of the presentation cover subjects that are of lesser interest to members of the audience, the presentation system can recommend that the amount of time allocated to discuss slides 4, 5, and 6 be reduced. In reducing the amount of time allocated to one or more slides, the presentation system further may reduce the amount of time allocated to such slides to zero. Reducing the amount of allocated time to zero effectively removes the slides from the presentation as the slides are removed from the list of slides to be displayed and are not shown, e.g., skipped.

In still another aspect, slides can be categorized by applying one or more attributes. For example, a slide or slides, or the presentation, can include metadata, e.g., an attribute, tag, etc., that categorizes slides as "introductory" or "detailed" in terms of the description of the information conveyed by the slide for a particular subject. The attribute for the slide, e.g., whether introductory or detailed, is specified or determined according to the amount of detail provided by the slide. Other exemplary attributes include, but are not limited to, "importance," "depth," or the like. It should be appreciated that in addition to applying the attributes, a level of the attribute can be assigned. Thus, an importance level and/or a depth level can be assigned. This allows the presentation system, for example, to reduce the time allocated to, or eliminate, detailed slides and/or slides of at least a particular depth level for subjects of lesser interest while maintaining introductory or overview type slides. As another illustration, slides considered important, or of at least a particular importance level, may be maintained or kept in the presentation regardless of audience interest. Accordingly, the presentation system can modify the presentation according to the categorization of a slide as introductory, detailed, the depth level, the importance level, etc.

As another example, if slides 4, 5, and 6 of the presentation cover subjects that are of greater interest to members of the audience, the presentation system can recommend that the amount of time allocated to slides 4, 5, and 6 be increased. In still another example, the presentation system can recommend increasing the amount of time allocated to detailed slides, important slides, and/or slides of at least a minimum level of importance of a subject considered to be of greater interest to members of the audience.

The presentation system also can generate the recommendation based upon whether delivery of the presentation is on schedule. As an illustration, when delivery of the presentation is ahead of schedule, the presentation system can recommend allocating more time to portions of the presentation that cover subjects determined to be of greater interest to members of the audience. When delivery of the presentation is behind schedule, the presentation system can recommend allocating less time to portions of the presentation that cover subjects determined to be of lesser or no interest to members of the audience.

In illustration, when the presentation system determines that delivery of the presentation is behind schedule, the recommendation may reduce the amount of time allocated to slides categorized as more detailed, slides with a level of importance not exceeding a predetermined threshold, etc. Further, slides considered more detailed or having an importance level not exceeding the predetermined threshold may be eliminated. The reduction in allocated time further may be restricted to detailed slides of lesser or no interest to the audience. In another example, when the presentation system determines that delivery of the presentation is ahead of schedule, the recommendation may increase the amount of time allocated to the slides considered more detailed, important, or of at least a minimum level of importance. The increase in allocated time further may be restricted to detailed slides of greater interest to the audience.

UI 300 also provides an "accept" control 345. The presenter may choose to accept the recommendation at any time by selecting control 345. Responsive to the user selecting control 345, the presentation system modifies the presentation in accordance with the recommendation. Any change(s) implemented are reflected in the slide order view 320 including the actual order of slides, the audience view 340, within the segment data shown above the slide order view, and within data presented in sections 330 and 335.

Figure 4:
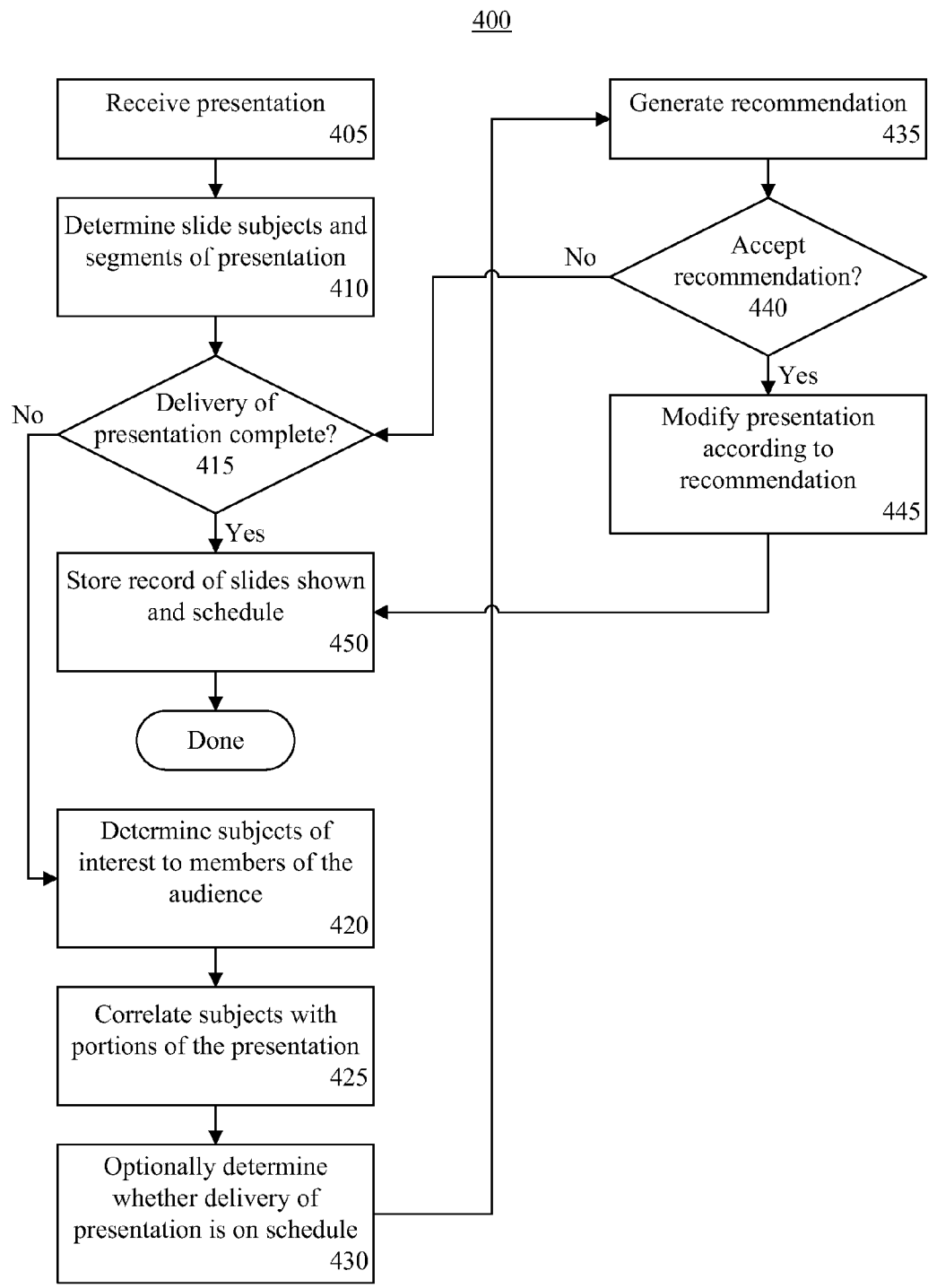
FIG. 4 is a flow chart illustrating an exemplary method of managing delivery of a presentation in real-time.

FIG. 4 is a flow chart illustrating an exemplary method 400 of managing delivery of a presentation in real-time. Method 400 can be performed by the presentation system described with reference to FIGS. 1-3 of this specification.

In block 405, the presentation system receives a presentation that is to be delivered. In block 410, the presentation system determines slide subjects of the presentation and segments of the presentation. In one aspect, the presentation can be annotated by a user to specify slide subjects and segments, for example, as metadata. In another aspect, the presentation system can perform a textual analysis and apply semantic processing to derive the slide subjects and segments directly from the content of the presentation itself.

In block 415, the presentation system determines whether delivery of the presentation is complete. If so, method 400 continues to block 450. If not, method 400 continues to block 420. In one aspect, delivery of the presentation is complete when the last slide of the presentation as determined by the slide order is displayed, when the user deactivates the presentation system, and/or when the entire amount of time scheduled for delivery of the presentation expires.

In block 420, the presentation system determines subjects of interest to members of the audience. In one aspect, the presentation system queries one or more social media websites for information such as subjects of interest for each member of the audience to which the presentation is being delivered. In determining subjects of interest to members of the audience, the presentation system can obtain content from social media websites, expressions of sentiment, items of created content, tags, and the like.

In block 425, the presentation system correlates subjects of interest determined from the social media websites with different portions of the presentation. More particularly, the presentation system matches subjects of interest for members of the audience with the slide subjects covered by the presentation. The presentation system tracks the subjects of interest to members of the audience that are matched to the slide subjects in terms of the number of members of the audience that have an interest in such matched subjects of interest and, as such, slide subjects. In one aspect, the correlation is performed on the slide by slide basis. In another aspect, the correlation is performed on a segment by segment basis.

In block 430, the presentation system optionally determines whether delivery of the presentation is on schedule. In one aspect, the presentation system measures the elapsed time from the start of delivery of the presentation. The presentation system then determines the current location within delivery of the presentation, e.g., the current slide, with the elapsed time to determine whether delivery of the presentation is ahead of schedule, on schedule, or behind schedule. Further, the presentation system can indicate the amount by which the presentation is ahead of schedule or behind schedule.

In block 435, the presentation system generates a recommendation. In one aspect, the recommendation is based solely upon the correlation of subjects of interest to members of the audience with slide subjects of the presentation. In another aspect, the recommendation is also based upon whether delivery of the presentation is on schedule. Further, generation of the recommendation, whether generated according to correlated subjects only and/or not being on schedule, is generated responsive to the determination that delivery of the presentation is not on schedule. As noted, the recommendation further may rely upon the categorization of a slide as "introduction" or "detailed" when determining whether to change the amount of time allocated to such a slide.

In block 440, the system determines whether the user, e.g., the presenter, has accepted the recommendation. Responsive to the user accepting the recommendation, method 400 proceeds to block 445. When the user does not accept the recommendation, method 400 loops back to block 415 to continue processing.

In block 445, the presentation system modifies the presentation according to the accepted recommendation. Modifying the presentation can include increasing the amount of time allocated to one or more slides, decreasing the amount of time allocated to one or more slides, and/or skipping or otherwise removing slides from the presentation by reducing the time allocated to such slides to zero so that such slides are not shown to the audience. It should be appreciated that reducing the time allocated to a slide to zero so that the slide is not shown to the audience changes the order of the slides of the presentation.

Referring to block 450, responsive to determining that delivery of the presentation is complete, the presentation system stores a record of each slide of the presentation that was displayed to the audience and the amount of time each slide displayed to the audience was actually displayed during delivery of the presentation. The presentation system, in effect, stores which slides were shown and the resulting schedule for the slides for future reference.

The embodiments disclosed herein determine subjects of interest for members of an audience. Subjects of interest can be determined from social media websites automatically and are updated in real-time as the presentation is delivered. Further, a correlation of those subjects is performed with slide subjects of a presentation being delivered to the audience. The presentation can be modified in accordance with the subjects of interest and/or whether the presentation is being delivered on schedule. As such, the presenter is able to better understand and focus on subjects of interest to the audience and manage the delivery of the presentation.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A method, comprising:
   receiving a presentation comprising a plurality of slides, wherein each slide of the plurality of slides is allocated an amount of time for display during delivery of the presentation and is associated with a slide subject;
   determining subjects of interest for an audience of the presentation from a social media website;
   correlating, using a processor, the subjects of interest with the plurality of slides of the presentation;
   generating, using the processor, a recommendation that specifies a modification to the presentation according to the correlation of subjects of interest with the plurality of slides of the presentation; and
   indicating the recommendation using a display.

2. The method of claim 1, further comprising:
   responsive to a user input accepting the recommendation, modifying, using the processor, the presentation according to the recommendation during delivery of the presentation.

3. The method of claim 1, wherein the modification is a change to the amount of time allocated for display of at least one slide of the plurality of slides during delivery of the presentation.

4. The method of claim 3, wherein the amount of time allocated to display the at least one slide is changed to zero and the slide is not displayed during delivery of the presentation.

5. The method of claim 1, wherein the modification is a change in an order in which the plurality of slides is displayed during delivery of the presentation.

6. The method of claim 1, wherein correlating, using the processor, the subjects of interest with the plurality of slides of the presentation comprises:
matching the subjects of interest determined from the social media website with the slide subjects; and
determining a number of members of the audience having an interest in at least one slide subject.

7. The method of claim 1, further comprising:
during delivery of the presentation, determining whether the presentation is on schedule;
wherein the modification specified in the recommendation is a change in the amount of time allocated for display of at least one slide of the presentation and the recommendation is generated responsive to determining that the presentation is not on schedule.

8. The method of claim 1, further comprising:
storing a record of each slide of the presentation displayed to the audience and the amount of time each slide displayed to the audience was displayed during delivery of the presentation.

9. A system comprising:
a processor programmed to initiate executable operations comprising:
receiving a presentation comprising a plurality of slides, wherein each slide of the plurality of slides is allocated an amount of time for display during delivery of the presentation and is associated with a slide subject;
determining subjects of interest for an audience of the presentation from a social media website;
correlating the subjects of interest with the plurality of slides of the presentation;
generating a recommendation that specifies a modification to the presentation according to the correlation of subjects of interest with the plurality of slides of the presentation; and
indicating the recommendation using a display.

10. The system of claim 9, wherein the processor further initiates executable operations comprising:
responsive to a user input accepting the recommendation, modifying, using the processor, the presentation according to the recommendation during delivery of the presentation.

11. The system of claim 9, wherein the modification is a change to the amount of time allocated for display of at least one slide of the plurality of slides during delivery of the presentation.

12. The system of claim 11, wherein the amount of time allocated to display the at least one slide is changed to zero and the slide is not displayed during delivery of the presentation.

13. The system of claim 9, wherein the modification is a change in an order in which the plurality of slides is displayed during delivery of the presentation.

14. The system of claim 9, wherein correlating the subjects of interest with the plurality of slides of the presentation comprises:
matching the subjects of interest determined from the social media website with the slide subjects; and
determining a number of members of the audience having an interest in at least one slide subject.

15. The system of claim 9, wherein the processor further initiates an executable operation comprising:
during delivery of the presentation, determining whether the presentation is on schedule;
wherein the modification specified in the recommendation is a change in the amount of time allocated for display of at least one slide of the presentation and the recommendation is generated responsive to determining that the presentation is not on schedule.

16. The system of claim 9, wherein the processor further initiates an executable operation comprising:
storing a record of each slide of the presentation displayed to the audience and the amount of time each slide displayed to the audience was displayed during delivery of the presentation.

17. A computer program product comprising a computer hardware storage device having program code stored thereon, the program code executable by a processor to perform a method comprising:
receiving, using the processor, a presentation comprising a plurality of slides,
wherein each slide of the plurality of slides is allocated an amount of time for display during delivery of the presentation and is associated with a slide subject;
determining, using the processor, subjects of interest for an audience of the presentation from a social media website;
correlating, using the processor, the subjects of interest with the plurality of slides of the presentation;
generating, using the processor, a recommendation that specifies a modification to the presentation according to the correlation of subjects of interest with the plurality of slides of the presentation; and
indicating, using the processor, the recommendation using a display.

18. The computer program product of claim 17, further comprising:
responsive to a user input accepting the recommendation, modifying, using the processor, the presentation according to the recommendation during delivery of the presentation.

19. The computer program product of claim 17, wherein the modification is a change to the amount of time allocated for display of at least one slide of the plurality of slides during delivery of the presentation.

20. The computer program product of claim 17, wherein the modification is a change in an order in which the plurality of slides is displayed during delivery of the presentation.

* * * * *